United States Patent
Puskarz

(10) Patent No.: US 7,263,879 B1
(45) Date of Patent: Sep. 4, 2007

(54) METHOD FOR WIND-NOISE TESTING OF AN AUTOMOBILE

(75) Inventor: Mitchell M. Puskarz, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/381,603

(22) Filed: May 4, 2006

(51) Int. Cl.
*G01M 9/00* (2006.01)
(52) U.S. Cl. .................................................. 73/147
(58) Field of Classification Search ................... 73/147
See application file for complete search history.

(56) References Cited

U.S. PATENT DOCUMENTS

| | | | |
|---|---|---|---|
| 4,662,217 A | * | 5/1987 | Hafner ........................ 73/147 |
| 5,495,754 A | * | 3/1996 | Starr et al. ..................... 73/147 |
| 6,615,652 B1 | * | 9/2003 | Bechstein et al. ............. 73/147 |
| 6,820,477 B2 | * | 11/2004 | Markstaller et al. .......... 73/147 |
| 7,107,831 B2 | * | 9/2006 | Markstaller et al. .......... 73/147 |

\* cited by examiner

*Primary Examiner*—Andre J. Allen
(74) *Attorney, Agent, or Firm*—Ralph E. Smith

(57) ABSTRACT

A method for wind-noise testing of an automobile in a wind tunnel is disclosed. The method includes measuring wind-noise generated by the automobile in a first condition. The first condition is the condition of the automobile with a predefined set of exterior components attached. The method further includes measuring the wind-noise generated by the automobile in a second condition. The second condition is the condition of the automobile with all exterior components removed and all individual gaps taped. The second condition is the fully quiet condition of the automobile. The method also includes measuring the wind-noise generated by the automobile after adding a single individual exterior component and/or un-taping an individual gap.

11 Claims, 6 Drawing Sheets

METHOD FOR WIND-NOISE TESTING OF AN AUTOMOBILE

FIELD OF THE INVENTION

The present invention relates in general to automobiles and in particular to wind-noise testing of automobiles.

BACKGROUND OF THE INVENTION

With the advancement of technology, newer methods and experiments are being designed to test the performance of automobiles. Experiments aimed at testing the automobiles in motion are performed in a wind tunnel. The wind tunnel is used to study the interaction of the automobile with an air stream by causing a high-speed stream of air to flow past the automobile. Experiments performed in the wind tunnel may vary from testing the aerodynamics of the automobile to testing the performance of the automobile in different atmospheric conditions.

In the wind tunnel, wind-noise testing can be performed to measure the wind-noise generated by an automobile. Wind-noise can be generated by exterior components, the exchange of airflow between the vehicle's interior and exterior and individual gaps in the automobile. Examples of these exterior components include, but are not limited to, mirrors, antennas, cross bows and wipers. Examples of individual gaps include, but are not limited to, gaps in the windscreen, gaps in the periphery of a door, and gaps around the hood.

However, existing methods of wind-noise testing may not be able to repeatedly and accurately determine the source of wind-noise. Further, these existing methods of wind-noise testing may not efficiently measure the wind-noise generated by each of the exterior components and each of the individual gaps in the automobile.

Hence, there is a need for a method for wind-noise testing, which accurately determines noise contributions from the vehicle sub-system area and the component responsible for abnormally high wind noise levels. Further, the method should accurately measure the wind-noise generated by the exterior components and the gaps in the automobile.

SUMMARY OF THE INVENTION

An object of the present invention is to provide a method for wind-noise testing that accurately and repeatably determines the sources of wind-noise in an automobile.

Another object of the present invention is to provide a method for wind-noise testing that accurately measures wind-noise generated by each of the exterior components and individual gaps in the automobile.

The present invention provides a method for wind-noise testing of an automobile. The method includes the step of measuring the wind-noise generated by the automobile in a first condition. The first condition is the condition of the automobile with a predefined set of exterior components attached. The method also includes measuring the wind-noise generated by the automobile in a second condition. The second condition is the "quiet" condition of the automobile with all exterior components removed and all individual gaps taped. The method further includes measuring the wind-noise generated by the components of the automobile after adding an individual exterior component or after un-taping an individual gap. Moreover, the method includes performing a frequency analysis of the wind-noise generated. The frequency analysis can be a third octave band analysis or a twelfth octave band analysis, depending on whether the wind-noise is a broadband noise or includes tonal components.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF THE VARIOUS EMBODIMENTS

The present invention describes a method for wind-noise testing of an automobile in a wind tunnel. The method includes measuring the wind-noise generated by the automobile in a first condition and in a second condition. The first condition is the condition of the automobile with a predefined set of exterior components attached. The second condition is the condition of the automobile with all exterior components removed and all individual gaps taped. The method further includes measuring the wind-noise in a third condition. The third condition is the condition of the automobile after either adding an exterior component or un-taping an individual gap.

Figure 1:
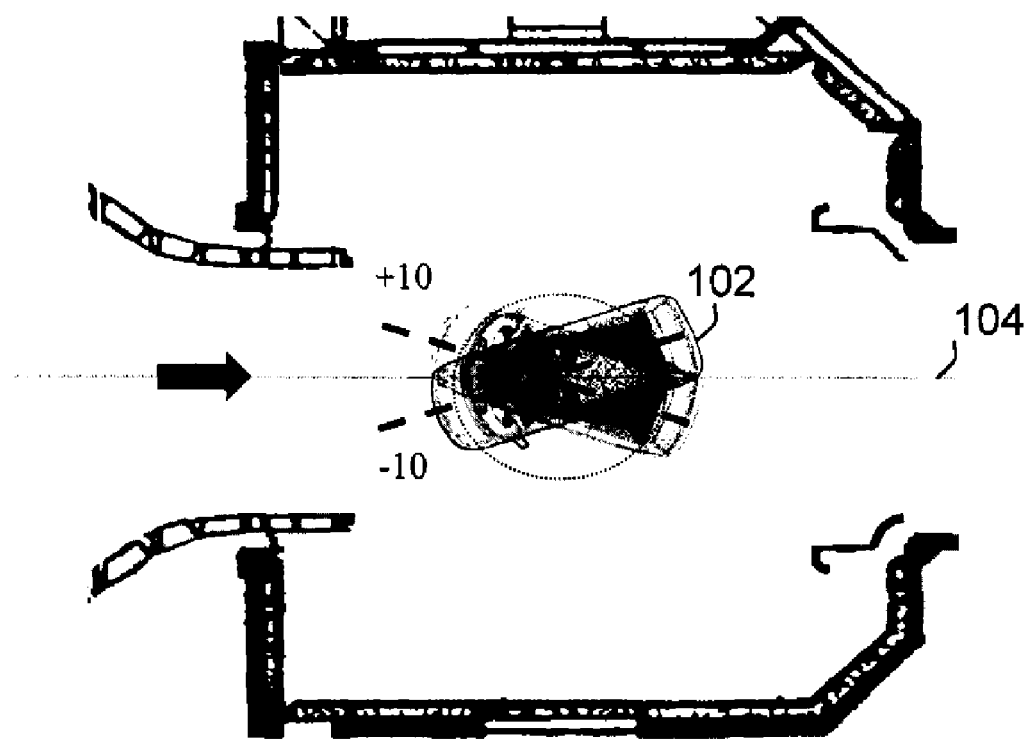
FIG. 1 illustrates a wind tunnel where various embodiments of the present invention may be practiced.

FIG. 1 illustrates a wind tunnel 100, where various embodiments of the present invention may be practiced. An automobile 102 is placed in the wind tunnel 100. The wind tunnel 100 is used to study the interaction of the automobile 102 with an air stream. The interaction of the air stream with the automobile 102 is then used to study the aerodynamics of the automobile 102. Since the aerodynamics of the automobile 102 and the wind-noise produced by an element (for example, an exterior component or an individual gap) may vary with the direction of the air stream (wind direction), wind-noise testing may be performed for more than one wind direction. For example, the air stream may be blown along an axis 104, which is parallel to length of the automobile 102. The air stream can also be blown at any flow angle that could be experienced by the vehicle while operating on the road at vehicle speeds where wind noise is a significant contributor (Typically speeds above 40 mph, and yaw angles from 0° to ±30°). Other exemplary values of the direction of the air stream relative to the axis 104 of the automobile 102 include, but are not limited to, a zero degree yaw and a ±10 degree yaw. 'Yaw' indicates the angle by which the automobile 102 is pointing away from the axis 104 due to rotation about its vertical axis.

Similarly, since the aerodynamics of the automobile 102 and the wind-noise generated by an element may vary with speed of the air stream (wind speed), wind-noise testing is performed for more than one wind speed. Some standard exemplary speeds of the air stream at which the wind-noise is measured may include, but are not limited to, 56 mph, 87 mph, and 124 mph.

Figure 2:
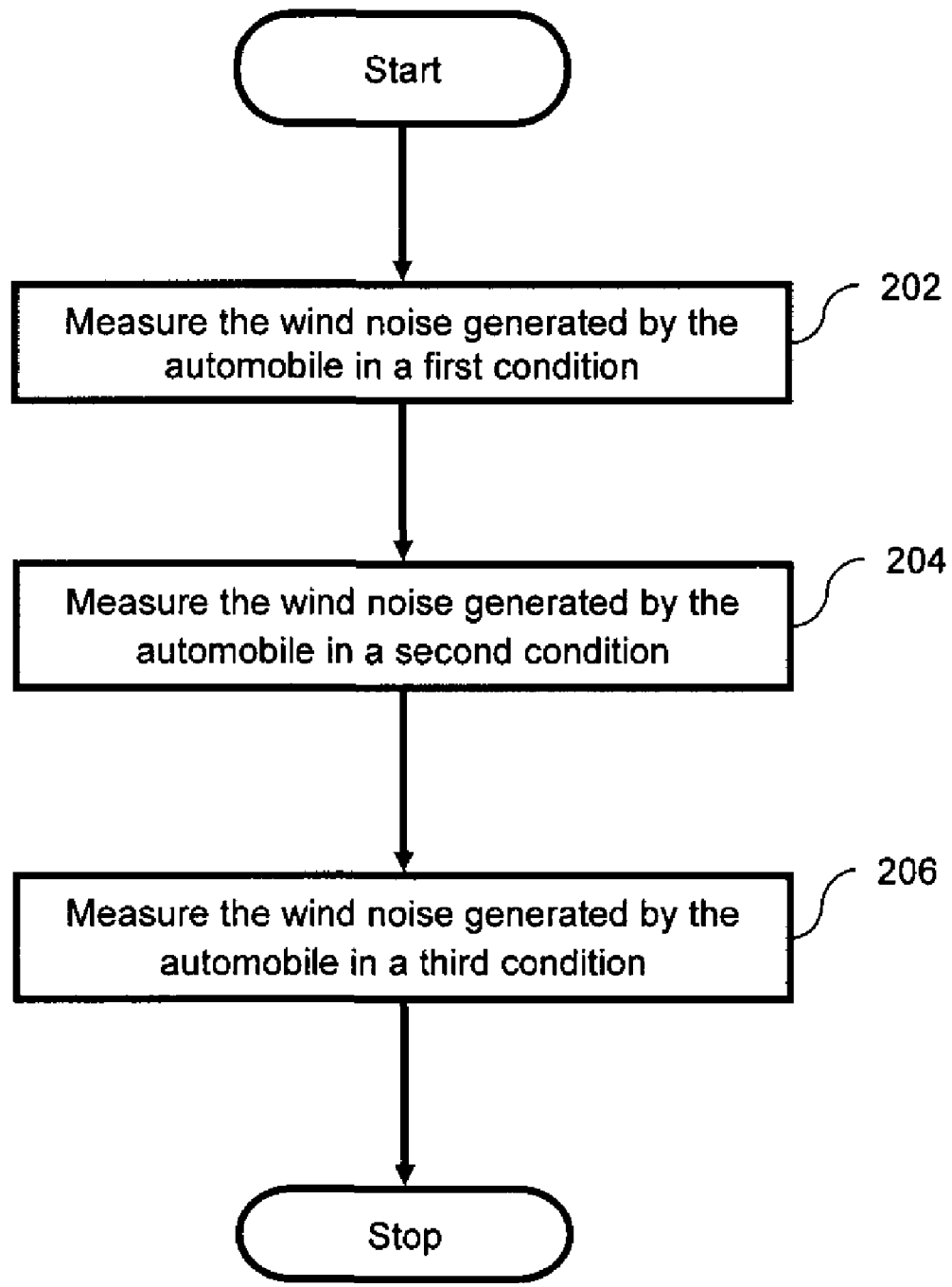
FIG. 2 depicts a flowchart illustrating a method for wind-noise testing of an automobile in a wind tunnel, in accordance with an embodiment of the present invention.

FIG. 2 depicts a flowchart illustrating a method for wind-noise testing of the automobile 102 in the wind tunnel 100, in accordance with an embodiment of the present invention. At step 202, the wind-noise generated by the automobile 102 in a first condition is measured. The first condition of the automobile 102 is the condition in which a predefined set of exterior components is attached to the automobile 102. The predefined set of exterior components may include a mirror, a wiper, a roof rack crossbow, and an antenna or other externally mounted components. In other words, the first condition of the automobile 102 is the automobile 102 with one or more of the predefined set of exterior components attached. In an embodiment of the present invention, the first condition is an as-received condition of the automobile 102. The as-received condition can be the condition of the automobile 102 as it is received from an assembly plant. In another embodiment of the present invention, the wind-noise testing in the wind tunnel 100 is performed on the automobile 102 after being used by a user. In this case, the as-received condition is the condition of the automobile 102 as received from the user.

At step 204, the wind-noise generated by the automobile 102 in a second condition is measured. The second condition is the condition of the automobile 102 with all exterior components removed and all individual gaps taped. In an embodiment of the present invention, the second condition is a fully quiet condition. It is intended that the automobile 102 generates the minimum possible wind-noise in the fully quiet condition.

At step 206, the wind-noise generated by the automobile 102 in a third condition is measured. The third condition is obtained by either adding an exterior component or un-taping an individual gap in the automobile 102 after testing it in the fully quiet condition. At this step, the wind-noise generated by each of the exterior components and each of the individual gaps in the automobile 102 is measured.

For example, in an embodiment, the wind-noise generated by the mirror of the automobile 102 is measured after attaching only the mirror to the automobile 102, after testing it in the fully quiet condition. In another example, the wind-noise generated by the gap in the windscreen is measured by un-taping the gap around the windscreen of the automobile 102 after testing it for the fully quiet condition.

The wind-noise is measured for different seat locations inside the automobile 102. Acoustic heads are mounted on different seat locations inside the automobile 102 and the wind-noise measurement is taken. In an embodiment of the present invention, the wind-noise may be measured for a left ear position of an acoustic head mounted on the driver's seat in the automobile 102. In another embodiment of the present invention, the wind-noise is measured simultaneously for other acoustic heads mounted on different seat locations along the driver's side in the automobile 102. This method allows comparison of noise contributions at front of the automobile 102 with the perception of an occupant (as measured by the acoustic head) in the second row seat or third row of the automobile 102.

In an embodiment of the present invention, the method includes performing a third octave band analysis on the wind-noise for a broadband noise. The spectrum of the broadband noise has no or little tonality (i.e. show no pronounced peaks) in frequencies in a given range. In other words, the third octave analysis is performed if the wind-noise generated is a broadband noise. Performing the third octave band analysis includes performing a Fast Fourier Transform (FFT) analysis. The method also includes reporting a maximum wind-noise difference relative to the "quiet" condition for frequencies in the third octave band. The method further includes comparing the maximum wind-noise difference for frequencies in the third octave band with one or more predefined target thresholds.

In another embodiment of the present invention, the method includes performing a twelfth octave band analysis on the wind-noise signal, which shows tonality or pronounced peaks in the narrowband spectrum. The spectrum of the narrowband noise has energy vectors for a narrow range of frequencies in a given range. The twelfth octave analysis is performed if the narrowband spectrum of the wind-noise shows tonal components (peaks). Performing the twelfth octave band analysis includes performing an FFT analysis of the wind-noise generated. The method further includes reporting the maximum wind-noise difference for frequencies in the twelfth octave band. The method further includes comparing the maximum wind-noise difference from the "quiet" condition for frequencies in the twelfth octave band with the one or more predefined target thresholds.

Figure 3:
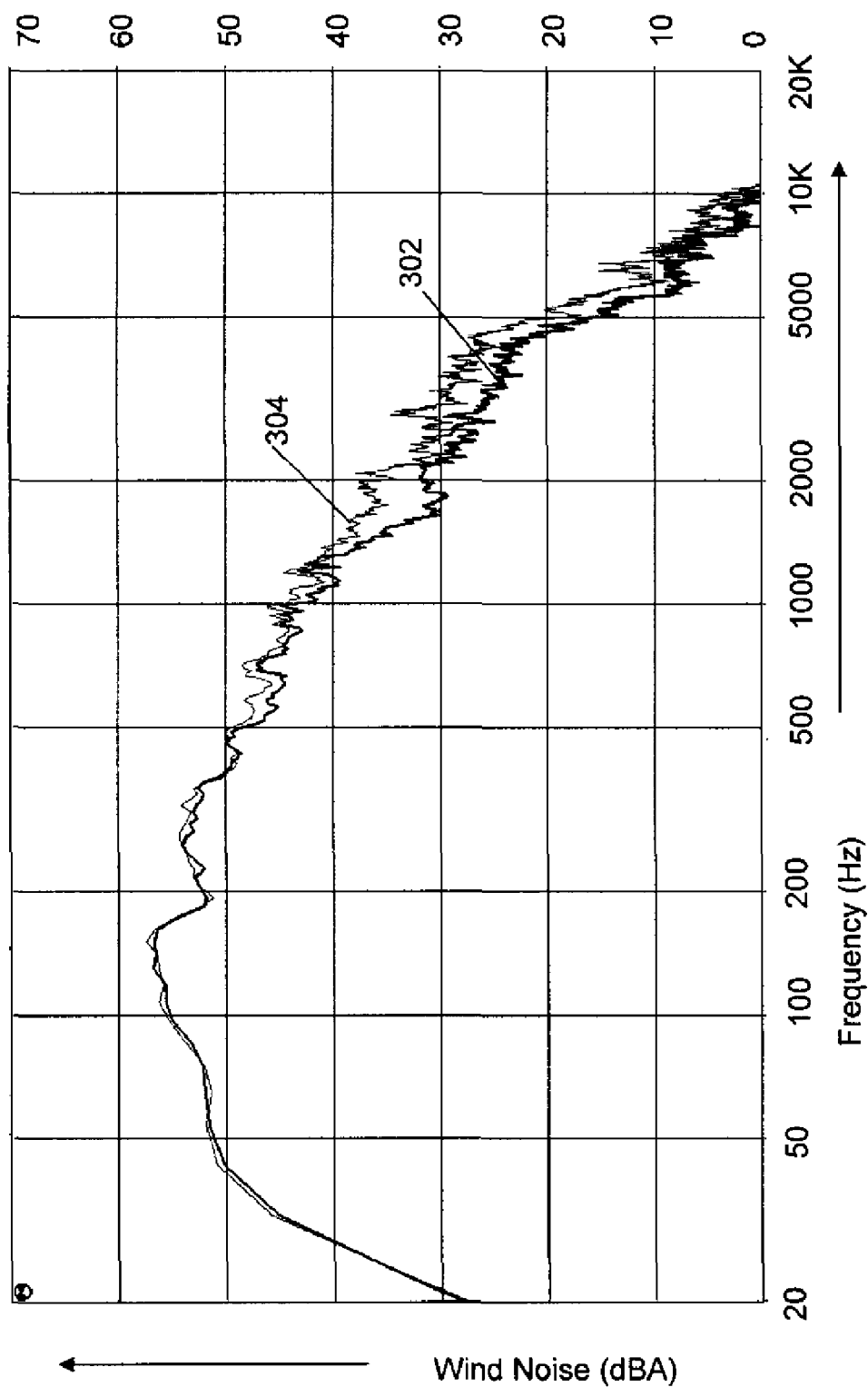
FIG. 3 illustrates a graph obtained after performing a narrowband frequency analysis for wind-noise generated by the automobile in the wind tunnel, in accordance with an exemplary embodiment of the present invention.

FIG. 3 illustrates a graph obtained after performing a narrowband frequency analysis on wind-noise generated by the automobile 102 in the wind tunnel 100, in accordance with an exemplary embodiment of the present invention. The X-axis represent frequency in Hertz (Hz) and the Y-axis represent the wind-noise in Decibels (dBA). The graph illustrates two different curves. A first curve 302 represents the FFT analysis of wind-noise generated by the automobile 102 in the second "fully quiet" condition. A second curve 304 represents the FFT analysis of wind-noise generated by the automobile in the third "door periphery un-taped" condition. It can be seen that in the frequency range 1000-2000 Hz, a lot of noise is produced by the untapped door periphery as compared to the "fully quiet" condition.

Figure 4:
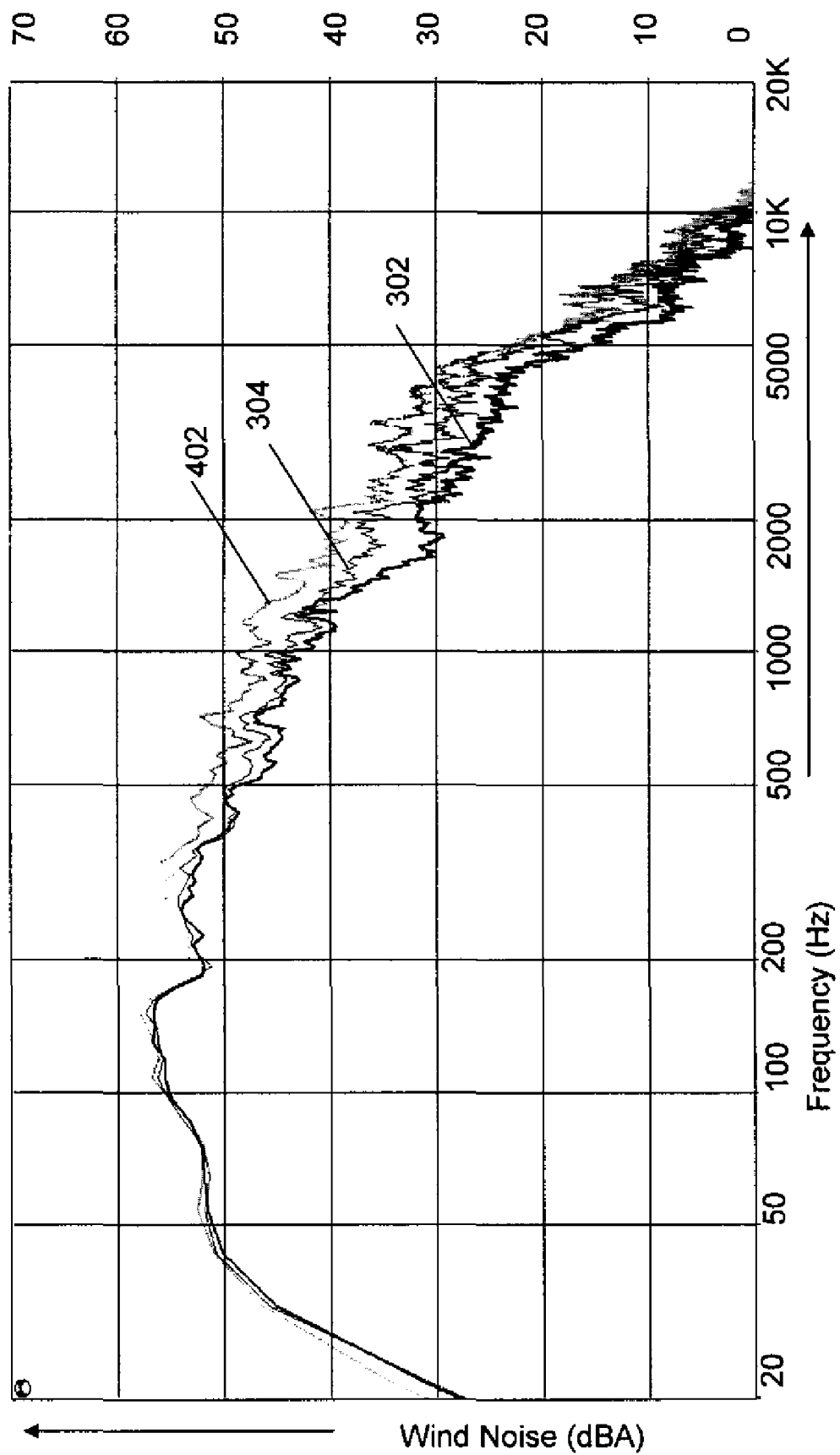
FIG. 4 illustrates a graph obtained after performing a narrowband frequency analysis for wind-noise generated by the automobile in the wind tunnel, in accordance with another exemplary embodiment of the present invention.

FIG. 4 illustrates a graph obtained after performing a narrowband frequency analysis on wind-noise generated by the automobile 102 in the wind tunnel 100, in accordance with an exemplary embodiment of the present invention. The X-axis represents frequency in Hertz (Hz), and the Y-axis represents the wind-noise in Decibels (dBA). The graph illustrates three different curves. A third curve 402 represents the FFT analysis of wind-noise generated by the automobile 102 in the first "as received" condition. Increase in the wind-noise is more in the first condition as compared to increase in the wind-noise in the in the third condition. This is due to the presence of a predefined set of exterior components attached The wind-noise generated by the automobile 102 in the first condition and the second condition is measured and the difference in the wind-noise generated in the two conditions is calculated.

After performing the third octave analysis for the wind-noise measured, a bar graph is plotted to depict the wind-noise difference for the wind-noise generated with the exterior component added or the individual gap un-taped. The bar graph represents a difference in wind-noise measured in the third condition and the fully quiet condition for frequencies in the third octave band.

Figure 5:
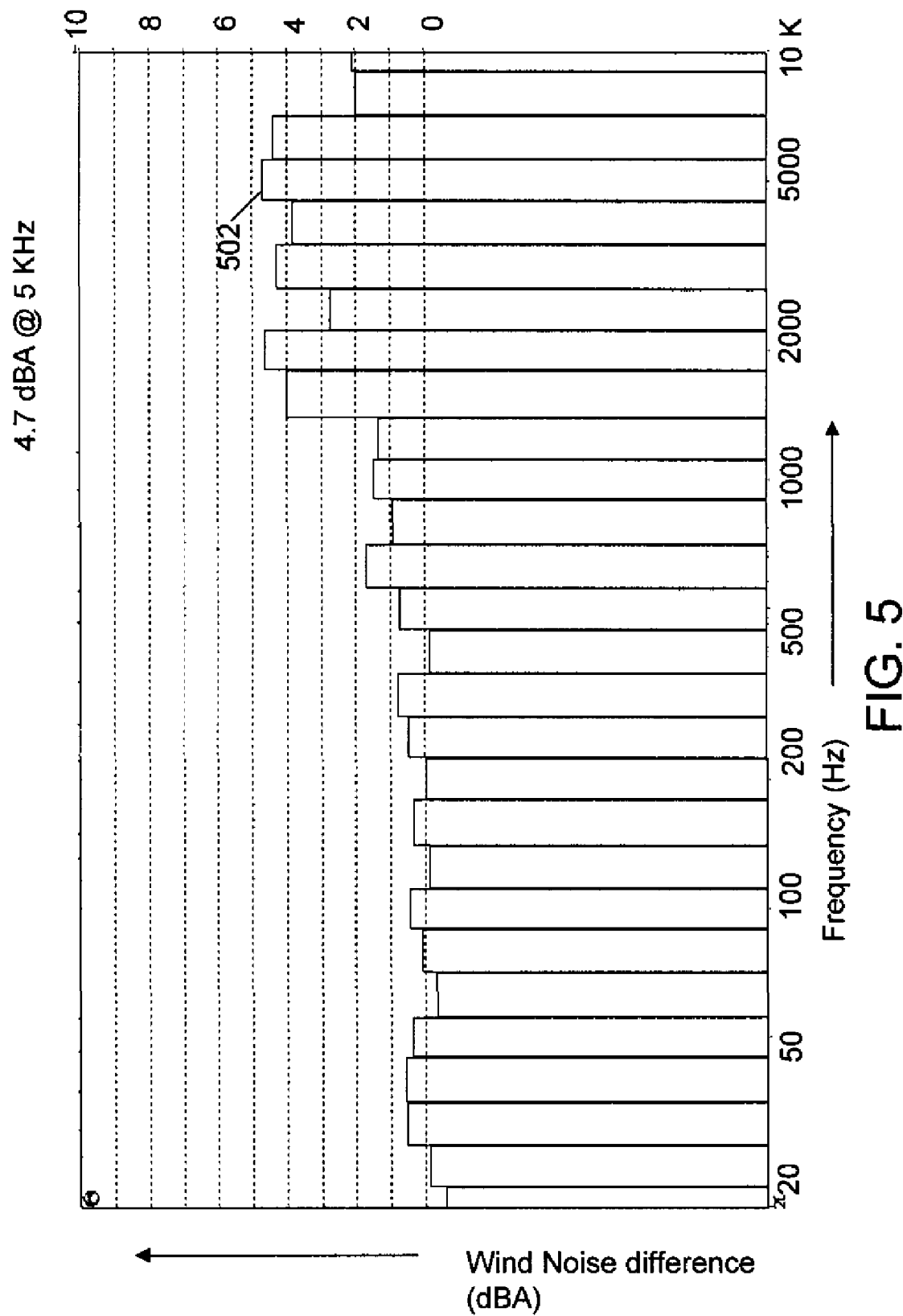
FIG. 5 illustrates a bar graph depicting the wind-noise difference for frequencies in the third octave band, in accordance with an embodiment of the present invention.

FIG. 5 illustrates the bar graph depicting the wind-noise difference for frequencies in the third octave band, in accordance with an exemplary embodiment of the present invention. The X-axis represents the frequencies in the third octave band in Hz, and the Y-axis represents the wind-noise difference in dBA relative to a predefined zero. In the example, the bar graph represents the wind-noise difference for the automobile 102 with the first door periphery untaped. The figure illustrates the maximum wind-noise difference 502 for a frequency in the third octave band. In the above-mentioned example, the value of the maximum wind-noise difference in the third octave band can be 4.7 dBA, and the value of the frequency at which the maximum wind-noise difference occurs can be 5000 Hz. In this case, the maximum wind-noise difference in the third octave band (i.e. 4.7 dBA) is reported.

Figure 6:
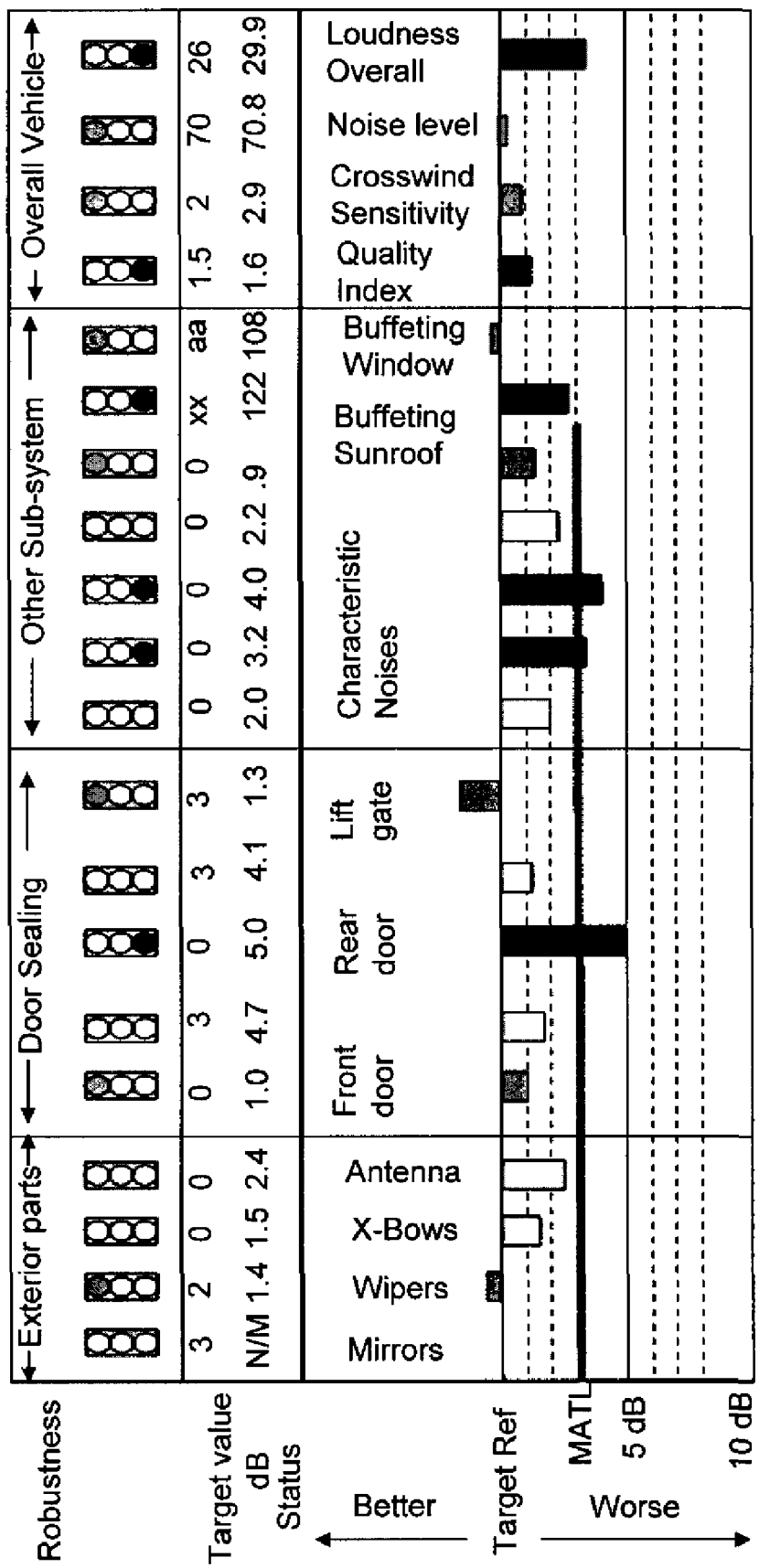
FIG. 6 illustrates a wind noise stop-light chart, in accordance with an exemplary embodiment of the present invention.

FIG. 6 illustrates a wind-noise stop-light chart, in accordance with an exemplary embodiment of the present invention. The maximum wind-noise difference is compared with one or more predefined thresholds. The one or more predefined thresholds represent the maximum acceptable wind-noise corresponding to an element of the vehicle. The one or more predefined thresholds are represented as Maximum Allowable Tolerance Limit (MATL) in the depicted wind-noise stop-light chart. If the maximum wind-noise difference, as obtained from the bar graph corresponding to the element is less than the MATL, then the design of that element can be considered acceptable as far as the wind-noise is concerned. In an exemplary embodiment of the present invention, if maximum wind-noise difference for a X-Bows is 1.5 dBA, and value of the predefined threshold is 3 dBA, then the design of the X-Bows can be accepted as far as wind-noise is concerned.

However, if the maximum wind-noise difference, as obtained from the bar graph corresponding to the element is more than the predefined threshold, then the design of that element may not be acceptable. In other words, various embodiments of the invention can provide an indication that the design of an exterior component or an individual gap in the automobile 102 needs to be redesigned, in order to reduce its contribution to the wind-noise generated.

An advantage of the above-mentioned method for wind-noise testing is that it repeatably determines the source of wind-noise in an automobile. The method objectively ranks the noise contributions (i.e. dBA levels) and shows the noise source location with respect to the front driver's seat. Another advantage of the method is that it can accurately measure the wind-noise generated by an exterior component or an individual gap. Further, the method enables us to determine whether an exterior component or an individual gap generating wind-noise is within or above an acceptable limit. The accurate determination of the source of wind-noise can help designers of automobiles to redesign a particular element so that the wind-noise generated by it remains within acceptable limits.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention, as described in the claims.

What is claimed is:

1. A method for wind-noise testing of an automobile in a wind tunnel, the method comprising:
   a. measuring the wind-noise generated by the automobile in a first condition, wherein the first condition is the condition of the automobile having a predefined set of exterior components;
   b. measuring the wind-noise generated by the automobile in a second condition, wherein the second condition is the condition of the automobile with all exterior components removed and all individual gaps taped; and
   c. measuring the wind-noise generated by at least one of the exterior components and the individual gaps of the automobile.

2. The method of claim 1 further comprises performing a third octave band analysis on the wind-noise for a broadband noise.

3. The method of claim 2, wherein performing the third octave band analysis comprises performing a Fast Fourier Transform (FFT) analysis on the wind-noise.

4. The method of claim 2 further comprising reporting a maximum noise difference for frequencies in the third octave band.

5. The method of claim 4 further comprising comparing the maximum noise difference for frequencies in the third octave band with one or more predefined target thresholds.

6. The method of claim 1 further comprises performing a twelfth octave band analysis on the wind-noise for a narrowband wind-noise with tonal noise components.

7. The method of claim 6, wherein performing the twelfth octave analysis comprises performing a Fast Fourier Transform (FFT) analysis on the wind-noise.

8. The method of claim 6 further comprising reporting a maximum noise difference for frequencies in the twelfth octave band.

9. The method of claim 8 further comprising comparing the maximum noise difference for frequencies in the twelfth octave band with one or more predefined target thresholds.

10. The method of claim 1, wherein wind-noise testing of the automobile in the wind tunnel is performed by varying one or more parameters.

11. The method of claim 10, wherein the one or more parameters are selected from a group comprising wind direction and wind speed.

* * * * *